(12) United States Patent
Kesavan et al.

(10) Patent No.: US 8,898,419 B2
(45) Date of Patent: Nov. 25, 2014

(54) SYSTEM AND METHOD FOR BALANCING BLOCK ALLOCATION ON DATA STORAGE DEVICES

(75) Inventors: Ram Kesavan, Sunnyvale, CA (US); Mrinal K. Bhattacharjee, Sunnyvale, CA (US); Sudhanshu Goswami, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 134 days.

(21) Appl. No.: 13/335,271

(22) Filed: Dec. 22, 2011

(65) Prior Publication Data

US 2013/0166838 A1 Jun. 27, 2013

(51) Int. Cl.
*G06F 12/00* (2006.01)

(52) U.S. Cl.
USPC .......................... 711/170; 711/114; 711/118

(58) Field of Classification Search
None
See application file for complete search history.

(56) References Cited

U.S. PATENT DOCUMENTS

| | | |
|---|---|---|
| 2002/0013887 A1 | 1/2002 | Ting |
| 2004/0093463 A1 | 5/2004 | Shang |
| 2006/0168409 A1 * | 7/2006 | Kahn et al. ................. 711/161 |
| 2008/0189342 A1 | 8/2008 | Bhattacharya et al. |
| 2010/0031003 A1 * | 2/2010 | Chen et al. ................. 712/30 |
| 2011/0022570 A1 * | 1/2011 | Hitz et al. .................. 707/661 |
| 2011/0035548 A1 * | 2/2011 | Kimmel et al. ............. 711/114 |

OTHER PUBLICATIONS

International Search Report and Written Opinion issued for PCT/US2012/071136, dated Mar. 15, 2013, 7 pages.

\* cited by examiner

*Primary Examiner* — Shawn X Gu
(74) *Attorney, Agent, or Firm* — LeClairRyan, a Professional Corporation

(57) ABSTRACT

A modular block allocator includes a front end module and a back end module communicating with each another via an application programming interface (API). The front end module receives cleaner messages requesting dirty buffers associated with the cleaner messages be cleaned. The back end module provides low and high level data structures which are formed by examining bitmaps associated with data storage devices. A stripe set data structure mapping to the low level data structures are formed. The front end module cleans the dirty buffers by allocating data blocks in the high level data structures to the dirty buffers. The low level data structures are used to map the allocated data blocks to the stripe set and when the stripe set is full it is sent to the data storage devices.

31 Claims, 4 Drawing Sheets

SYSTEM AND METHOD FOR BALANCING BLOCK ALLOCATION ON DATA STORAGE DEVICES

TECHNICAL FIELD

This invention relates to data storage systems and methods and, more specifically, to systems and methods for balancing block allocation on data storage devices.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

A data storage system includes one or more storage devices. A storage device may be a disk drive organized as a disk array. Although the term "disk" often refers to a magnetic storage device, in this context a disk may, for example, be a hard disk drive (HDD) or a solid state drive (SSD) or any other media similarly adapted to store data.

In a data storage system, information is stored on physical disks as storage objects referred to as volumes that define a logical arrangement of disk space. The disks in a volume may be operated as a Redundant Array of Independent Disks (RAID). A volume may have its disks in one or more RAID groups. The RAID configuration enhances the reliability of data storage by the redundant writing of data stripes across a given number of physical disks in a RAID group and the storing of redundant information (parity) of the data stripes. The physical disks in a RAID group may include data disks and parity disks. The parity may be retrieved to recover data when a disk fails.

Information on disks is typically organized in a file system, which is a hierarchical structure of directories, files and data blocks. A file may be implemented as a set of data blocks configured to store the actual data. The data blocks are organized within a volume block number (VBN) space maintained by the file system. The file system may also assign each data block in the file a corresponding file block number (FBN). The file system assigns sequences of FBNs on a per-file basis, while VBNs are assigned over a large volume address space. The file system generally comprises contiguous VBNs from zero to n−1, for a file system of size n blocks.

An example of a file system is a write-anywhere file layout (WAFL) that does not overwrite data on disks when that data is updated. Instead an empty data block is retrieved from a disk into a memory and is updated or modified (i.e., dirtied) with new data, and the data block is thereafter written to a new location on the disk. A write-anywhere file system may initially assume an optimal layout such that the data is substantially contiguously arranged on disks, which results in efficient read operation. When accessing a block of a file in response to a request, the file system specifies a VBN that is translated into a disk block number (DBN) location on a particular disk within a RAID group. Since each block in the VBN space and in the DBN space is typically fixed (e.g., 4 K bytes) in size, there is typically a one-to-one mapping between the information stored on the disks in the DBN space and the information organized by the file system in the VBN space. The requested data block is then retrieved from the disk and stored in a buffer cache of the memory as part of a buffer tree of the file. The buffer tree is an internal representation of blocks for a file stored in the buffer cache and maintained by the file system.

If a data block is updated or modified by a central processing unit (CPU) or processor, the dirty data remains in the buffer cache for a period of time. Multiple modifying operations by the CPU are cached before the dirty data is stored on the disk (i.e., the buffer is cleaned). The delayed sending of dirty data to the disk provides benefits such as amortized overhead of allocation and improved on-disk layout by grouping related data blocks together. In the write anywhere file system, the point in time when a collection of changes to the data blocks is sent to the disk is known as consistency point (CP). A CP may conceptually be considered a point-in-time image of the updates to the file system since the previous CP. The process of emptying the buffer cache by sending the dirty data to the disk is accomplished by collecting a list of inodes that have been modified since the last CP and then cleaning the inodes by flushing the inodes to the disk. An inode is a data structure used to store information, such as metadata, about a file, whereas data blocks are data structures used to store the actual data for the file. The information in an inode may include ownership of the file, access permission for the file, size of the file, and file type and references to locations on disk of the data blocks for the file. The references to the locations of the file data are provided by pointers which may reference the data blocks.

Initially a CPU issues a cleaner message indicating that the dirty buffers of one or more inodes need to be allocated on disks. In response, a block allocator in the file system selects free blocks on disks to which to write the dirty data and then queues the dirty buffers to a RAID group for storage. The block allocator examines a block allocation bitmap to select free blocks within the VBN space of a logical volume. The selected blocks are generally at consecutive locations on the disks in a RAID group for a plurality of blocks of a particular file. When allocating blocks, the file system traverses a few blocks of each disk to lay down a plurality of stripes per RAID group. In particular, the file system chooses VBNs that are on the same stripe per RAID group to avoid parity reads from disks.

For efficient utilization of storage resources, it is desirable to balance block allocation across storage devices in RAID groups. Improvements which will allow balanced block allocation are desired.

BRIEF SUMMARY OF THE INVENTION

The present invention is directed to systems and methods for balancing block allocation on storage devices using a hierarchical data structure for mapping data across storage devices. According to embodiments of the invention, a low level data structure of the hierarchical data structure is formed by examining one or more storage devices. The storage devices may comprise a plurality of RAID groups. A high level data structure of the hierarchical data structure that maps to the low level data structure is also formed according to embodiments of the invention. The high level data structure is used to clean dirty buffers associated with a cleaner message by allocating data blocks in the high level data structures to the dirty buffers. The data blocks allocated using the high level data structure are mapped to a stripe set (i.e., data structure comprising a plurality of stripes each mapping to a set of data blocks) using the low level data structure and the stripe set is sent to storage devices when the stripe set is full. The low level data structures are then used to map the allocated data blocks to bitmaps.

In one embodiment of the invention, a method includes providing a plurality of block allocation areas from N storage devices of a RAID group by dividing the storage devices into a plurality of regions. The block allocation areas span across the N storage devices and comprise N regions, at least one region from each of the N storage devices. A region comprises a plurality of sequential disk blocks on one of the N storage devices. The block allocation areas are classified based on a number of free data blocks available in each block allocation area. The block allocation areas are divided into a plurality of block allocation units. According to embodiments of the invention, a block allocation unit is the maximum number of consecutive FBNs of a file which are written to sequential DBNs of a disk. A block allocation unit size may vary (e.g., 64 disk blocks, 128 disk blocks, etc.).

Embodiments provide a low level bucket cache comprising a plurality of low level buckets each mapping to a plurality of the aforementioned block allocation units and provide a high level bucket cache comprising a plurality of high level buckets each mapping to a plurality of consecutive block allocation units in a single storage device in two respective low level buckets. Thus, according to embodiments of the invention, a low level bucket spans all storage devices of a RAID group, whereas a high level bucket spans a single storage device. In one embodiment, a high level bucket cache comprises buckets from all storage devices in the RAID groups. When a cleaner message is received, dirty buffers associated with the cleaner message are cleaned by selecting one of the high level buckets and allocating data blocks of the high level bucket to the dirty buffers. Since a high level bucket spans only a single storage device and a high level bucket cache spans all storage devices in the RAID groups, as the data blocks in the high level buckets are allocated to the dirty buffers, block allocation is balanced over all storage devices of the RAID groups. The low level bucket is used to map the allocated data blocks to a stripe set and to send the stripe set to storage devices when the stripe set is full. The low level bucket is also used to update filesystem bitmaps.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
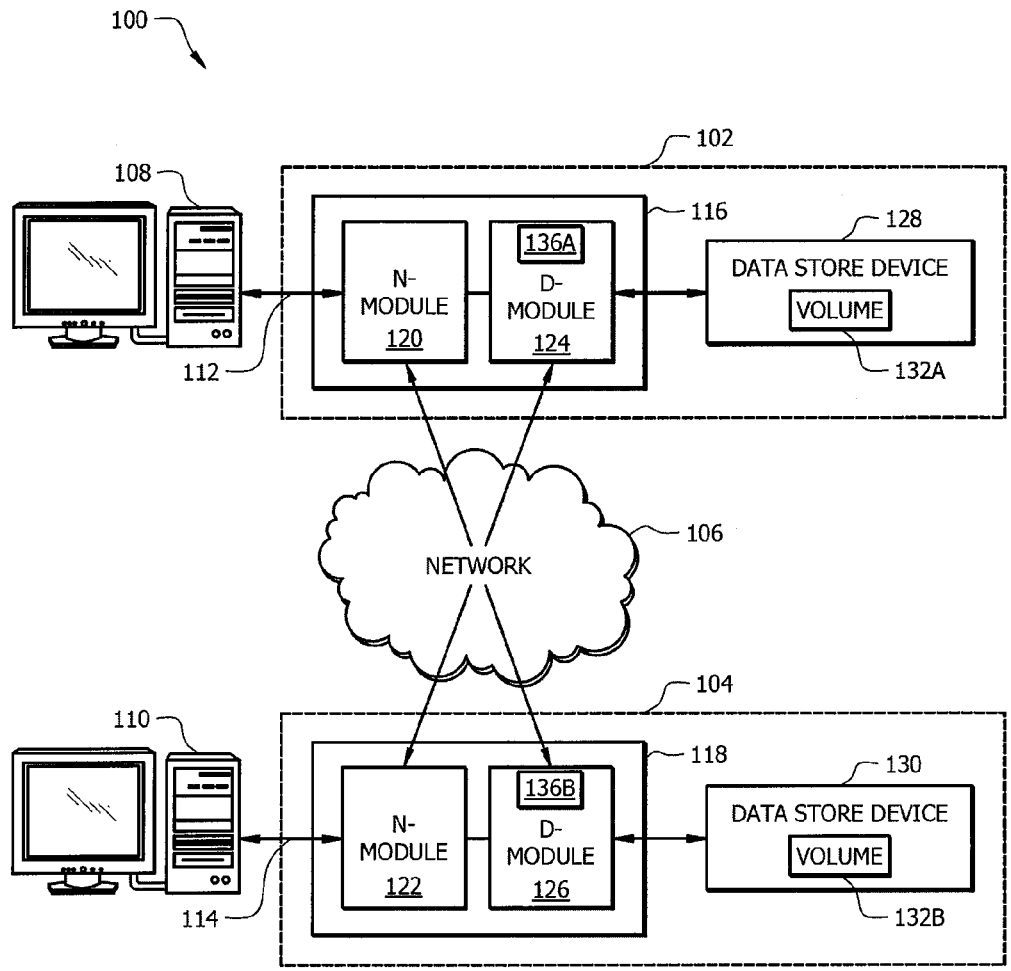
FIG. 1 is a block diagram of a system adapted according to one embodiment of the invention to provide balanced block allocation.

FIG. 1 shows a block diagram of a system adapted according to embodiments of the invention to provide balancing of block allocation on data storage devices. System 100 of FIG. 1 comprises an exemplary clustered network environment in which data storage systems 102 and 104 are coupled via a network 106. Data storage systems 102 and 104 work together to provide the clustered network environment. Data storage systems 102 and 104 of embodiments may comprise one or more modules, components, etc. operable to provide operation as described herein. For example, data storage systems 102 and 104 of the illustrated embodiment comprise nodes 116 and 118 and data store devices 128 and 130, respectively. It should be appreciated that the nodes and/or data store devices of the data storage systems 102 and 104 may themselves comprise one or more modules, components, etc. Nodes 116 and 118 of the illustrated embodiment comprise network modules (referred to herein as "N-Modules") 120 and 122 and data modules (referred to herein as "D-Modules") 124 and 126, respectively. Data store devices 128 and 130 of the illustrated embodiment comprise volumes 132A and 132B of user and/or other data, respectively.

The modules, components, etc. of data storage systems 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 128 and 130 may, for example, comprise disk memory, flash memory, optical memory, solid state memory, and/or other suitable computer readable media. It will be apparent to those skilled in the art that data store devices 128 and 130 may comprise one or more RAID Groups. Each of storage systems 102 and 104 may further implement a storage operating system, portions of which are typically resident in memory and executed by the processor, which functionally organizes the storage system by, in one embodiment, invoking operations in support of a storage services implemented by the storage system. To facilitate access to data store devices 128 and 130, the storage operating system may further implement a file system that logically organizes the information as a hierarchical structure of directories and files on the disks using a e.g., write-anywhere file layout. In one embodiment, nodes of the storage system may carry out respective operations of the storage operating system to enable the N-Module and D-Module to provide respective network and data store device access services respectively.

In one embodiment, modular block allocator 136A resides in data module 124 and modular block allocator 136B resides in the data module 126. Modular block allocators 136A and 136B, as will be explained later, balance block allocation on data store devices 128 and 130. Data modules 124 and 126 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear a locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data store device 130 via communication network 106 and data module 126 of node 118. The foregoing operation provides a clustered storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

Figure 2:
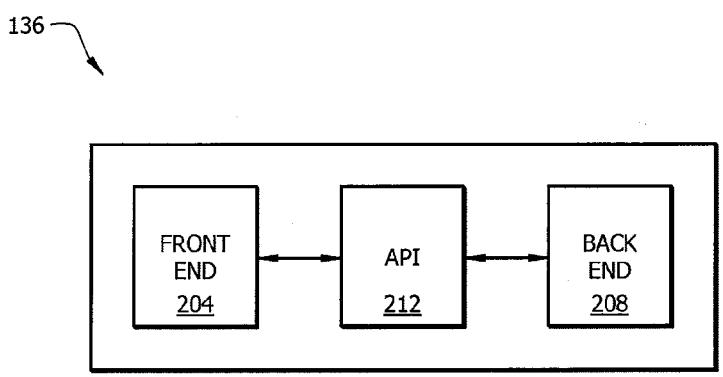
FIG. 2 illustrates a modular block allocator in accordance with one embodiment of the invention.

FIG. 2 illustrates modular block allocator 136 in accordance with embodiments of the invention. Modular block allocator 136 includes front end module 204 and back end module 208 communicating with each another via application programming interface (API) 212. Front end module 204 receives cleaner messages originating from clients 108 and 110 requesting dirty buffers associated with the cleaner messages be cleaned. According to embodiments of the invention, back end module 208 provides hierarchical data structures comprising a low level data structure and a high level data structure which are formed by examining data store devices 128 and 130. The low level and high level data structures may be created by examining bitmaps associated with storage devices 128 and 130 and may be stored, for example, in a memory. Front end module 204 cleans the dirty buffers by allocating data blocks of the high level data structures to the dirty buffers. Back end module 208 uses the low level data structures to map the allocated data blocks to a stripe set and to send the stripe set to the storage devices when the stripe set is full. The low level data structures are also used to update files system bitmaps. API 212 facilitates communication and transfer of the data structures between front end module 204 and back end module 208.

Figure 3A:
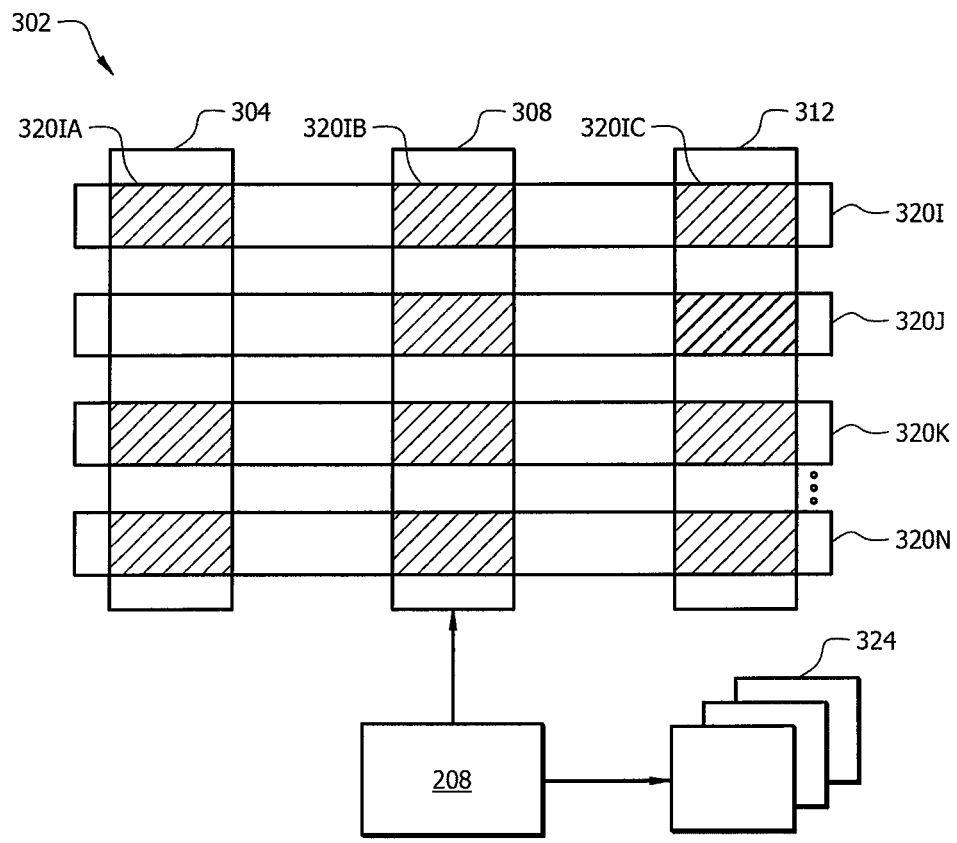
FIGS. 3A and 3B illustrate block allocation areas in accordance with one embodiment of the invention.

FIG. 3A illustrates aspects of the invention in more detail in which an exemplary storage system 302 (e.g., or may correspond to storage device 120, storage device 130 or a combination thereof) which includes three disks 304, 308 and 312. Although FIG. 3A illustrates a storage system having three disks, it will be understood by those skilled in the art that a storage system typically includes a plurality of RAID groups, each RAID group having a plurality of disks. Back end module 208 divides storage system 302 into a plurality of block allocation areas. By way of example, RAID group 300 has been divided into N block allocation areas 320I-320N. N is a predetermined number and is an integer. In some embodiments, a block allocation area comprises a plurality of regions, at least one from a disk. For example, block allocation area 320I comprises regions 320IA, 320IB and 320IC. Thus, a block allocation area spans a plurality of disks. Regions 320IA, 320IB and 320IC are formed in respective disks 304, 308 and 312. In some embodiments of the invention, block allocation areas 320I, 320J and 320K each comprise 4096 consecutive stripes.

Referring again to FIG. 3A, back end module 208 uses bitmap 324 associated with storage system 302 to sort or rank the block allocation areas based on free data blocks available. It will be appreciated that a bitmap shows free data blocks available in a storage device. In one embodiment, a data block is a volume block number (VBN) in a file system. A VBN maps to a disk block number (DBN) on a disk.

In embodiments of the invention, back end module 208 assigns a score which is an estimate of free data blocks in the block allocation areas and sorts the block allocation areas based on the scores. The block allocation areas may be sorted or ranked, for example. in an ascending order based on the scores. The score represents the estimate of free VBNs available in a block allocation area. In some embodiments, back end module 298 selects a block allocation area receiving the highest score from each RAID group. It will be understood by those skilled in the art that by selecting the block allocation area having the highest score, a probability of writing a full stripe on disks is increased due to there being more free blocks in the selected block allocation area.

Figure 3B:
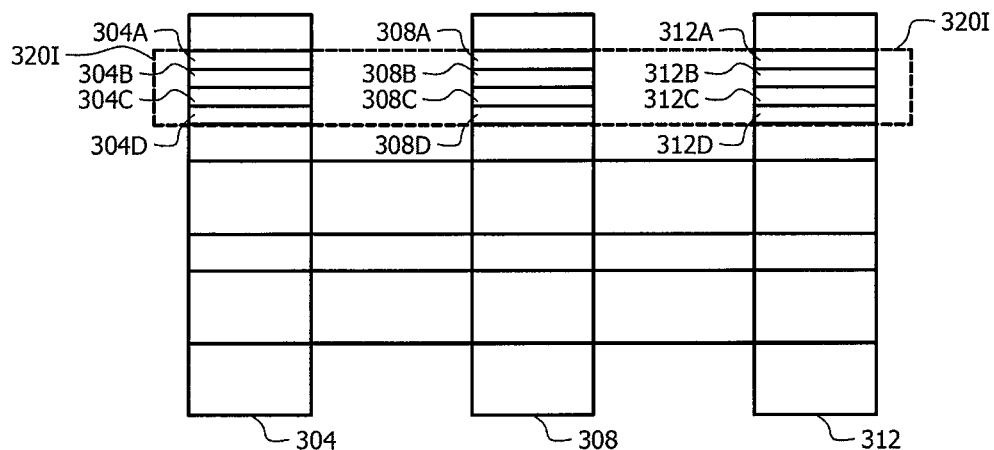

Referring still to FIG. 3A, consider for example, that back end module 208 selects block allocation area 320I because area 320I received the highest score based on free data blocks available. Next, the block allocation areas are divided into a plurality of block allocation units. Referring now to FIG. 3B, by way of example, block allocation area 320I is divided into a plurality of block allocation units 304A-304D, 308A-308D, and 312A-312D. A block allocation unit resides within a disk. For example, block allocation units 304A, 308A and 312A reside within disks 304, 308 and 312, respectively. A block allocation unit can be considered a sub-unit of a region. So, for example, block allocation units 304A-204D are sub-units of region 320IA. Similarly, block allocation units 308A-308D are sub-units of region 320IB. A block allocation unit comprises a set of data blocks that a block allocator using a high level data structure of embodiments of the invention allocates to a disk before a switch is made to the next disk. By limiting the number of blocks a block allocator may write to a particular disk and making a switch to a next disk, block allocation is balanced or spread across a plurality of disks of the storage system and a full stripe may be written on the RAID groups. In general, the term "stripe" refers to a collection of blocks in a volume with the same DBN number on each disk. The number of data blocks in a block allocation unit may vary depending on system configurations. For example, a block allocation unit may comprise 64 data blocks or 128 data blocks.

Figure 4:
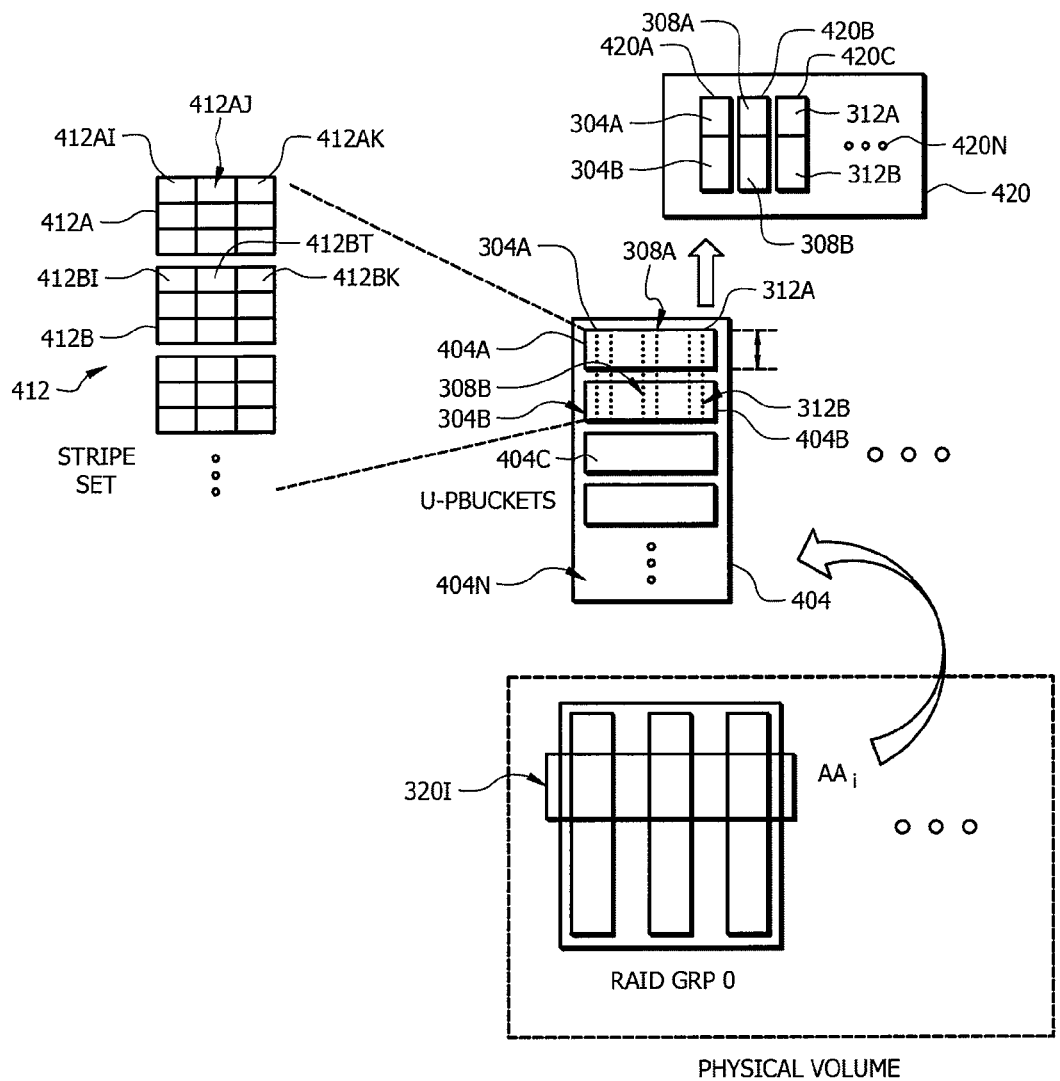
FIG. 4 illustrates formation of bucket caches in accordance with one embodiment of the invention.

The block allocation units of the selected block allocation area are used to form a data structure referred to as a low level bucket cache. Referring now to FIG. 4, by way of example, block allocation units in block allocation area 320I are used to form low level bucket cache 404. A low level bucket cache comprises a plurality of low level buckets. Low level bucket cache 404 comprises low level buckets 404A-404N. According to embodiments of the invention, a low level bucket is a data structure having a plurality of block allocation units, one from each disk. By way of example, low level bucket 404A comprises block allocation units 304A, 308A and 312A. Similarly, low level bucket 404B comprises block allocation units 304B, 308B and 312B. Thus, a low level bucket spans across all disks. According to embodiments of the invention, low-level buckets 404A-404N may be created when system 100 is started or when storage systems 102 and 104 are initialized.

According to embodiments, back end module 208 forms a plurality of stripe sets 412A-412N that map to buckets in the low level cache. A stripe set comprises a plurality of stripes. By way of example, stripe set 412A comprises stripes 412Ai, 412Aj, 412Ak, . . . , 412An, each mapping to either one or a plurality of low level buckets. As low level buckets are created, back end module 208 also creates corresponding stripe set data structures.

Back end module 208 of embodiments also forms a high level bucket cache 420 comprising a plurality of high level buckets 420A-420N. According to embodiments of the invention, a high level bucket is a data structure that maps to a plurality of low level buckets. According to embodiments of the invention, a high level bucket comprises two consecutive block allocation unit of data blocks spanning across two low level buckets but residing in a same disk. In other words, a high level bucket includes two consecutive block allocation units, each from a respective low level bucket, residing in a same disk. For example, high level bucket 420A maps to block allocation units 304A and 304B. Block allocation units 304A and 304B, which map to low level buckets 404A and 404B, respectively, both reside in disk 304. Similarly, high level bucket 420B maps to block allocation units 308A and 308B. Block allocation units 308A and 308B, which map to low level buckets 408A and 408B, respectively, both reside in disk 308. Thus, according to embodiments of the invention a low level bucket comprises a plurality of block allocation units, one from each disk in a RAID group whereas a high level bucket comprises two block allocation units, each from a respective low level bucket, but both residing in a same disk. In other words, a low level bucket spans across all disks in a RAID groups whereas a high level bucket maps to a single disk. Referring still to FIG. 4, high level buckets 420A, 420B and 420C maps to disks 304, 308 and 312, respectively. Thus, each high level bucket in high level bucket cache 420 maps to a respective disk. According to embodiments of the invention, back end module 208 creates high-level bucket cache 420 after low-level buckets are created. According to embodiments of the invention, a plurality of RAID groups contribute to a high level bucket cache via their low level bucket caches so that block allocation is balanced across all disks. According to embodiments of the invention, the high level bucket cache is a lock protected data structure. Thus, multiple cleaner messages executing on multiple CPUs can request high level buckets and safely work on the high level buckets.

In operation, according to embodiments of the invention, when front end module 204 (FIG. 2) receives a cleaner message originating from a processor, front end module 204 requests API 212 to provide a high level bucket from high level bucket cache 420. A cleaner message may originate from a processor at, for example, a consistency point. It will be appreciated that a cleaner message contains a request to clean dirty buffers associated with that cleaner message. In response, API 212 obtains a high level bucket from high level bucket cache 420 and passes the high level bucket to front end module 204. Consider for example, responsive to a request, API 212 passes high level bucket 420A to front end module 204. Next, front end module 204 allocates VBNs associated with high level bucket 420A to the dirty buffers associated with the cleaner message. In embodiments of the invention, API 212 responsive to a request selects the first bucket queued in high level bucket cache 420 and passes that bucket to front end module 204. After the first bucket in the queue is consumed, API 212 passes the next bucket in the queue in response to the next request. By way of example, after high level bucket 420A is consumed, API 212 passes the next bucket which in this example is high level bucket 420B, and after high level bucket 420B is consumed, high level bucket 420C is consumed. As explained before, high level buckets 420A, 420B and 420C maps to disks 304, 308 and 312, respectively, block allocation is balanced or distributed across the disks. According to embodiments of the invention, after the VBNs of a high level bucket has been allocated, back end module maps the allocated VBNs to the stripe set. As mentioned before, a stripe set maps to low-level buckets and furthermore a high-level bucket maps to a plurality of low-level buckets. Thus, it will be appreciated that the allocated VBNs of a high-level bucket may be mapped to the stripe set. After block allocation units 304A, 308A and 312A have been consumed using high level buckets 420A, 420B and 420C, low level bucket 404A is removed from low level bucket cache 404. According to embodiments of the invention, back end module 208 uses low level bucket 404A to update file system bitmaps to reflect that corresponding VBNs have been allocated. High level bucket 420A then maps to 304B and 304C. Similarly high level bucket 420B maps to 308B and 308C. According to embodiments of the invention, the process is repeated until all low level buckets from the low level bucket cache are removed and thereafter the block allocation area having the next highest score is selected to form new low level buckets. Thereafter, additional high level buckets are formed out of the low level buckets. As noted before, as VBNs of the high level buckets are allocated, back end module 208 maps the allocated VBNs to the stripe set. When a stripe set is full, back end module 208 sends the stripe set to the RAID groups.

According to embodiments of the invention, if after servicing a cleaner message a high level bucket has more than one block allocation unit of data blocks still available, the high level bucket is returned to the high level bucket cache so it may be re-used responsive to the next cleaner message. If the high level bucket has less than one block allocation unit available, the high level bucket is set aside. When all high level buckets of a RAID group have less than one block allocation unit available, the high level buckets stop mapping into the first low level bucket and start mapping into the next low level bucket in the bucket cache. Consequently, cleaner messages always have at least one block allocation unit of allocatable blocks. According to embodiments of the invention, high level bucket 420A begins by mapping to block allocation units 304A and 304B of low level buckets 404A and 404B, respectively. Similarly, high level bucket 420B begins by mapping to block allocation units 308A and 308B of low level buckets 404A and 404B, respectively, and high level bucket 420C begins by mapping to block allocation units 312A and 312B of low level buckets 404A and 404B. After block allocation units 304A, 308A and 312A have been consumed using respective high level buckets 420A, 420B and 420C, high level bucket 420A next maps to 304B and 304C, high level bucket 420B next maps to 308B and 308C, and high level bucket 420C next maps to 312B and 312C.

Figure 5:
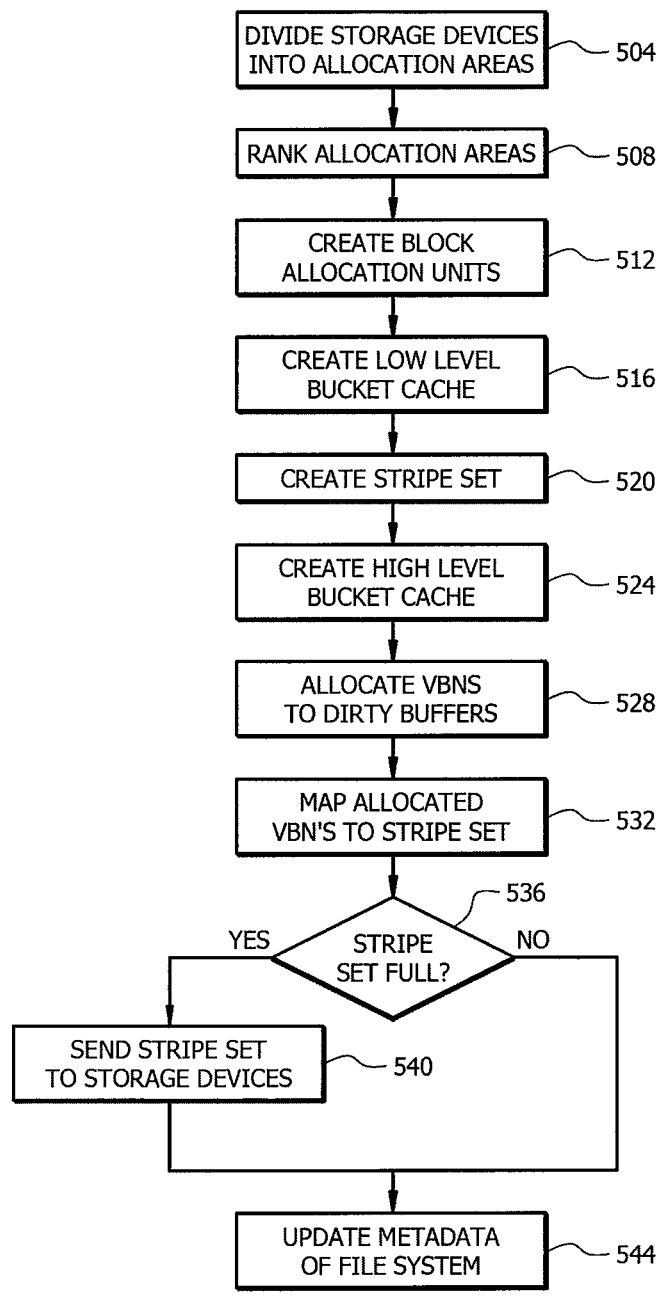
FIG. 5 is a flow diagram in accordance with one embodiment of the invention.

FIG. 5 is a flow diagram of a method in accordance with embodiments of the invention. In step 504, storage devices (e.g., disks) are divided into a predetermined number of block allocation areas. According to embodiments of the invention, a back end module divides the storage devices into block allocation areas. In step 508, the block allocation areas are ranked based on the number of free data blocks available in the block allocation area. In step 512, the block allocation area receiving the highest score is selected and divided into a predetermined number of write allocation units. In some embodiments, a block allocation unit defines a number of data blocks that a block allocator writes to a disk before it switches to the next disk.

In step 516, a low level bucket cache is formed using a plurality of block allocation units of the selected block allocation area in accordance with the method described before. The low level bucket cache comprises a plurality of low level buckets. In embodiments of the invention, the low level bucket is formed using one block allocation unit from each disk of the selected block allocation area.

In step 520, a stripe set is formed that maps to the low level buckets. The stripe set is a data structure comprising a plurality of stripes each mapping to a set of data blocks. In step 524, a high level bucket cache is formed in accordance with the method described before. A high level bucket cache comprises a plurality of high level bucket. As explained before, a high level bucket maps to a single disk in two low level buckets. In embodiments of the invention, a high level bucket comprises a plurality of block allocation units of data blocks.

In step 528, VBNs of a high level bucket are allocated to dirty buffers of a cleaner message. In step 532, the allocated VBNs are mapped to a stripe set. In decision block 536, back end module 208 checks if the stripe set is full. If the stripe set is full, in step 540, back end module 208 sends the stripe set to the storage devices (e.g., RAID groups). In step 544, metadata of the file system is updated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of balancing block allocation comprising:
providing, by a storage management computing device, a low level data structure comprising a plurality of data blocks mapped across N storage devices;
providing, by the storage management computing device, a high level data structure mapped to at least two consecutive data blocks of the plurality of data blocks of the low level data structure and mapped to one of the N storage devices;
cleaning, by the storage management computing device, dirty buffers by allocating the at least two consecutive data blocks of the plurality of data blocks mapped to the high level data structure to the dirty buffers;
mapping, by the storage management computing device, the allocated at least two consecutive data blocks of the plurality of data blocks to a stripe set using the low level data structure; and
passing the stripe set to the N storage devices when the stripe set is full.

2. The method of claim 1, further comprising:
providing, by the storage management computing device, a plurality of block allocation areas from the N storage devices by dividing the N storage devices into a plurality of regions, the plurality of block allocation areas span across the N storage devices and comprise N regions at least one from a respective storage device;
classifying, by the storage management computing device, the plurality of block allocation areas based on a number of free data blocks available in the plurality of block allocation areas; and
selecting, by the storage management computing device, one of the classified plurality of block allocation areas and dividing the selected block allocation area into a plurality of block allocation units, wherein the plurality of block allocation units are distributed across the N storage devices.

3. The method of claim 2, wherein the low level data structure is mapped to the plurality of block allocation units of the selected block allocation area.

4. The method of claim 3, wherein the low level data structure comprises a low level bucket mapped to one of the plurality of block allocation units from each of the N storage devices.

5. The method of claim 4, wherein the low level bucket is mapped to the plurality of block allocation units, wherein each of the plurality of block allocation units maps to a specific storage device.

6. The method of claim 4, wherein the high level data structure comprises a high level bucket mapped to two consecutive block allocation units of the plurality of block allocation units from a specific storage device.

7. The method of claim 6, wherein the high level bucket is mapped to the two consecutive block allocation units of the plurality of block allocation units each from a respective low level bucket, wherein the two consecutive block allocation units of the plurality of block allocation units from respective low level bucket reside in a same disk.

8. The method of claim 7, further comprising:
receiving, by the storage management computing device, a cleaner message requesting that dirty buffers associated with the cleaner message be cleaned;

cleaning, by the storage management computing device, dirty buffers by allocating a plurality of data blocks of the high level bucket to dirty buffers.

9. The method of claim 2, further comprising selecting, by the storage management computing device, the classified plurality of block allocation areas comprising a maximum number of free data blocks.

10. The method of claim 2, wherein a free data block is a free volume block number (VBN) of a file system.

11. The method of claim 10, wherein the VBN maps to a disk block number (DBN) on one of the N storage devices.

12. The method of claim 1, wherein N is an integer.

13. A non-transitory computer readable medium having stored thereon instructions for block allocation balancing comprising machine executable code which when executed by at least one processor, causes the at least one processor to perform steps comprising:
providing a low level data structure comprising a plurality of data blocks mapped across N storage devices;
providing a high level data structure mapped to at least two consecutive data blocks of the plurality of data blocks of the low level data structure and mapped to one of the N storage devices;
cleaning dirty buffers by allocating the at least two consecutive data blocks of the plurality of data blocks mapped to the high level data structure to the dirty buffers;
mapping the allocated at least two consecutive data blocks of the plurality of data blocks to a stripe set using the low level data structure; and
passing the stripe set to the N storage devices when the stripe set is full.

14. The medium of claim 13, further comprising:
providing a plurality of block allocation areas from the N storage devices by dividing the N storage devices into a plurality of regions, the plurality of block allocation areas spanning across the N storage devices and comprising N regions at least one from a respective storage device;
classifying the plurality of block allocation areas based on a number of free data blocks available in the plurality of block allocation areas; and
selecting one of the classified plurality of block allocation areas and dividing the selected the block allocation area into a plurality of block allocation units, wherein the plurality of block allocation units are distributed across the N storage devices.

15. The medium of claim 14, wherein the low level data structure maps to the plurality of block allocation units of the selected the block allocation area.

16. The medium of claim 15, wherein the low level data structure comprises a low level bucket mapped to one of the plurality of block allocation units from each of the N storage devices.

17. The medium of claim 16, wherein the low level bucket maps to the plurality of block allocation units, wherein each of the plurality of block allocation units maps to a specific storage device.

18. The medium of claim 17, wherein the high level data structure comprises a high level bucket mapped to two consecutive block allocation units from a plurality of block allocation units from a specific storage device.

19. The medium of claim 18, wherein the high level bucket maps to the two consecutive block allocation units of the plurality of block allocation units each from a respective low level bucket, and wherein the two consecutive block allocation units of the plurality of block allocation units from respective low level bucket reside in a same disk.

20. The medium of claim 19, further comprising:
receiving a cleaner message requesting dirty buffers associated with the cleaner message be cleaned; and
cleaning dirty buffers by allocating a plurality of data blocks of the high level bucket to dirty buffers.

21. The medium of claim 15, further comprising selecting the classified block allocation area comprising a maximum number of free data blocks.

22. The medium of claim 15, wherein a free data block is a free volume block number (VBN) of a file system.

23. The medium of claim 22, wherein the VBN maps to a disk block number (DBN) on one of the N storage devices.

24. The medium of claim 14, wherein N is an integer.

25. A block allocation balancing device comprising:
a processor;
a memory, configured to store programmed instructions, wherein the processor, when executing the stored programmed instructions:
associates N storage devices with a network;
maps a low level data structure comprising a plurality of data blocks across the N storage devices;
maps a high level data structure to at least two consecutive data blocks of the plurality of data blocks of the low level data structure and mapped to one of the N storage devices,
wherein dirty buffers are cleaned by allocating the at least two consecutive data blocks of the plurality of data blocks mapped to the high level data structure to the dirty buffers and mapping the allocated at least two consecutive data blocks of the plurality of data blocks using the low level data structure to a stripe set.

26. The device of claim 25, wherein the processor, when executing the stored programmed instructions in the memory:
forms a plurality of block allocation areas from the N storage devices by dividing the N storage devices into a plurality of regions, the plurality of block allocation areas span across the N storage devices and comprise N regions at least one from a respective storage device; and
forms a plurality of block allocation units by dividing a selected plurality of block allocation areas, wherein the plurality of block allocation units are distributed across the N storage devices.

27. The device of claim 26, wherein the low level data structure maps to the plurality of block allocation units of the selected plurality of block allocation areas.

28. The device of claim 27, wherein the low level data structure comprises a low level bucket mapped to one of the plurality of block allocation units from each of the N storage devices.

29. The device of claim 27, wherein the low level bucket maps to the plurality of block allocation units, wherein each of the plurality of block allocation units maps to a specific storage device.

30. The device of claim 29, wherein the high level data structure comprises a high level bucket mapped to two consecutive block allocation units of the plurality of block allocation units from a specific storage device.

31. The device of claim 30, wherein the high level bucket maps to the two consecutive block allocation units of the plurality of block allocation units each from a respective low level bucket, and wherein the two consecutive block allocation units of the plurality of block allocation units from respective low level bucket reside in a same disk.

* * * * *